(12) United States Patent
Ohtani et al.

(10) Patent No.: US 12,121,179 B2
(45) Date of Patent: Oct. 22, 2024

(54) SERVER APPARATUS, METHOD, AND NON-TRANSITORY COMPUTER READABLE MEDIUM FOR QUANTITATIVE EXPRESSED RECIPE

(71) Applicant: Cookpad Inc., Tokyo (JP)

(72) Inventors: Shinya Ohtani, Tokyo (JP); Masayuki Ioki, Tokyo (JP); Akihisa Kaneko, Tokyo (JP); Tomomichi Sumi, Tokyo (JP)

(73) Assignee: COOKPAD INC., Tokyo (JP)

( * ) Notice: Subject to any disclaimer, the term of this patent is extended or adjusted under 35 U.S.C. 154(b) by 688 days.

(21) Appl. No.: 17/213,240

(22) Filed: Mar. 26, 2021

(65) Prior Publication Data
US 2021/0212504 A1    Jul. 15, 2021

Related U.S. Application Data

(63) Continuation of application No. PCT/JP2019/032293, filed on Aug. 19, 2019.

(30) Foreign Application Priority Data

Sep. 28, 2018 (JP) ................................ 2018-185926

(51) Int. Cl.
*A47J 36/32* (2006.01)
*G05B 15/02* (2006.01)
(Continued)

(52) U.S. Cl.
CPC .............. *A47J 36/32* (2013.01); *G05B 15/02* (2013.01); *G06F 40/151* (2020.01); *G06N 20/00* (2019.01)

(58) Field of Classification Search
CPC ..... G06N 20/00; G06F 40/289; G06F 40/151; G06F 40/157; G06F 40/16; G06F 40/216;
(Continued)

(56) References Cited

U.S. PATENT DOCUMENTS 10,303,136 B2 * 5/2019 Shinomoto .............. G09G 5/00
2006/0251784 A1 * 11/2006 Sells ........................ A21B 3/04
426/510
(Continued)

FOREIGN PATENT DOCUMENTS

JP        2002-063178 A      2/2002

*Primary Examiner* — Etienne P Leroux
(74) *Attorney, Agent, or Firm* — XSENSUS LLP

(57) ABSTRACT

A server apparatus which includes a memory that stores recipe information including a plurality of cooking processes, and circuitry that acquires the recipe information, specifies, in the acquired recipe information, a cooking process described with a qualitative expression, searches the recipe information stored in the memory for the qualitative expression described in the specified cooking process, converts the qualitative expression described in the specified cooking process into a quantitative expression based on a result of the search, and sends, to a user terminal via the internet, quantitative recipe information including the quantitative expression which corresponds to the acquired recipe information, for controlling a cooking appliance based on the quantitative recipe information.

11 Claims, 9 Drawing Sheets

(51) Int. Cl.
*G06F 40/151* (2020.01)
*G06N 20/00* (2019.01)
(58) Field of Classification Search
CPC ........ G06F 16/00; G06Q 50/10; G05B 15/02; A47J 36/02
See application file for complete search history.

(56) References Cited

U.S. PATENT DOCUMENTS

| | | | |
|---|---|---|---|
| 2009/0092723 A1* | 4/2009 | Flynn, Jr. ............... | A47J 36/321 426/523 |
| 2012/0316984 A1* | 12/2012 | Glassman .............. | G06Q 50/06 705/26.7 |
| 2016/0239179 A1* | 8/2016 | Kim ........................ | G06F 3/14 |
| 2017/0097934 A1* | 4/2017 | Aso ........................ | G06Q 30/02 |

* cited by examiner

SERVER APPARATUS, METHOD, AND NON-TRANSITORY COMPUTER READABLE MEDIUM FOR QUANTITATIVE EXPRESSED RECIPE

CROSS-REFERENCE TO RELATED APPLICATION

This application is a continuation of International Patent Application No. PCT/JP2019/32293, filed on Aug. 19, 2019, which claims priority from Japanese Patent Application No. 2018-185926, filed on Sep. 28, 2018, both of which are incorporated by reference herein in its entirety.

TECHNICAL FIELD

The present disclosure relates to a server apparatus, an information processing terminal, a system, a method, and a program that convert qualitative expressions in recipe information into quantitative expressions.

BACKGROUND

In recent years, various recipes have been published through the Internet, television programs, magazines, and the like. The published recipes each describe a cooking procedure, and ordinary users can use these recipes. For example, Patent Literature 1 discloses a method for providing cooking recipe data as a result of a search requested by a user, over a communication network from a host apparatus storing a plurality of cooking recipe data items.

CITATION LIST

Patent Literature

Patent Literature 1: Japanese Patent Laid-Open No. 2002-063178

SUMMARY

The present disclosure provides a server apparatus which includes a memory that stores recipe information including a plurality of cooking processes, and circuitry that acquires the recipe information, specifies, in the acquired recipe information, a cooking process described with a qualitative expression, searches the recipe information stored in the memory for the qualitative expression described in the specified cooking process, converts the qualitative expression described in the specified cooking process into a quantitative expression based on a result of the search, and sends, to a user terminal via the internet, quantitative recipe information including the quantitative expression which corresponds to the acquired recipe information, for controlling a cooking appliance based on the quantitative recipe information.

DETAILED DESCRIPTION

Technical Problem

Figure 1:
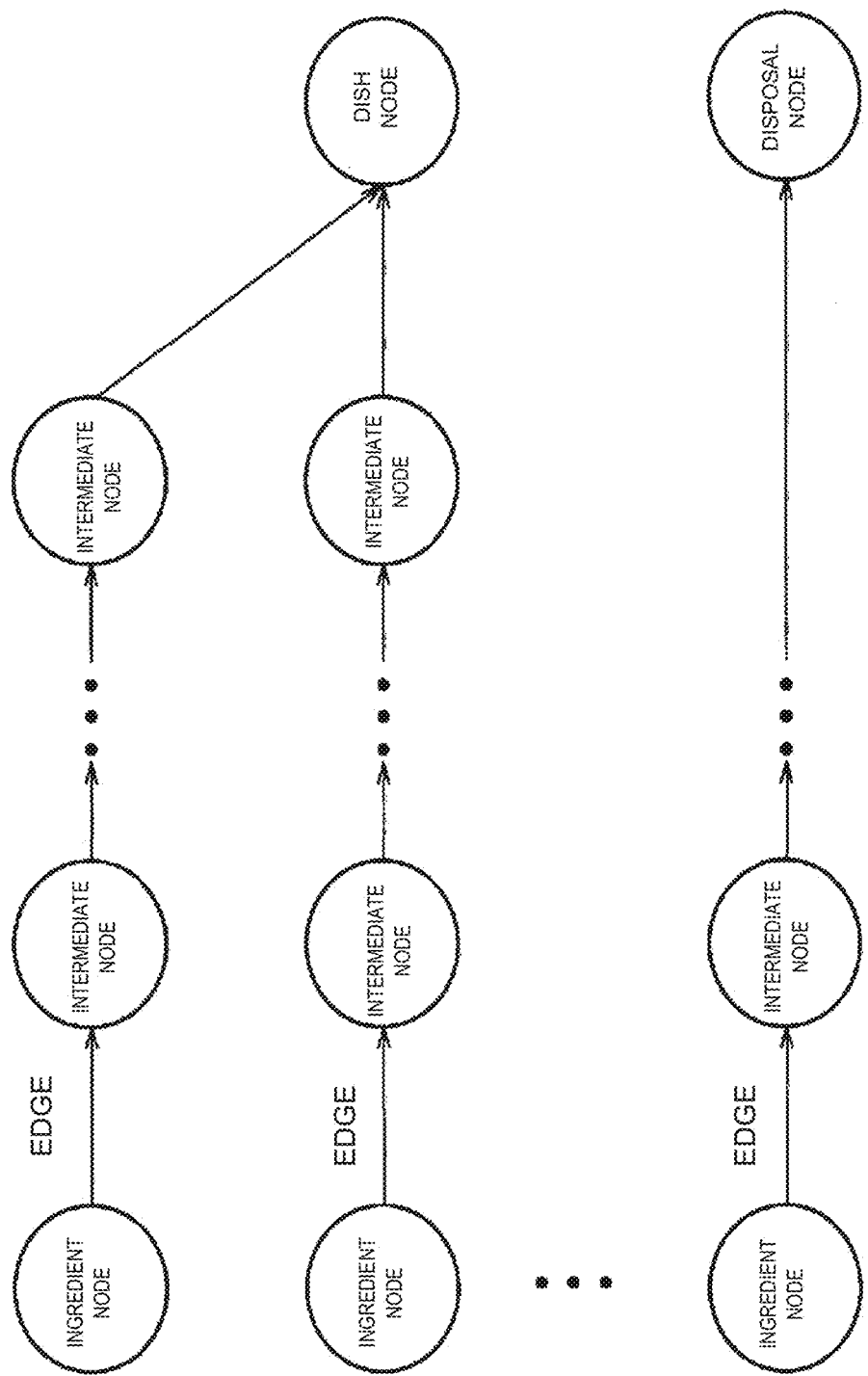
FIG. 1 is a diagram illustrating a data structure of appliance control recipe information.

Cooking processes in recipes include various kinds of expressions. For example, cooking recipe data as described in Patent Literature 1 includes qualitative expressions such as "add a little bit of salt" and "boil it thoroughly", which are not expressed with numeric values such as quantity, cooking temperature, and cooking time. When a cooker makes a dish using a cooking appliance, such qualitative expressions cannot tell the cooker a temperature setting and a cooking time for the cooking appliance, and the like, and thus the cooker in some cases fails to make a dish as the recipe suggests.

In addition, home appliances have become more IoT-oriented in recent years; amid the emergence of network-aware cooking appliances such as smart home appliances, recipes including qualitative expressions, which are unsuitable for controlling cooking appliances, may become difficult to use.

Hence, in view of such circumstances, an object of the present disclosure is to provide a server apparatus, an information processing terminal, a system, a method, and a program that convert qualitative expressions in recipe information into quantitative expressions.

Solution to Problem

To accomplish the objective described above, a server apparatus according to the present disclosure includes a recipe information storage unit that stores recipe information including a plurality of cooking processes, an acquisition unit that acquires the recipe information, a specification unit that specifies a cooking process described with a qualitative expression from the acquired recipe information, a search unit that searches for a qualitative expression described in the specified cooking process from pieces of recipe information stored in the recipe information storage unit, and a conversion unit that converts a description of the specified cooking process into a quantitative expression based on a result of the search made by the search unit.

In addition, to accomplish the objective described above, an information processing terminal according to the present disclosure includes a recipe information storage unit that stores recipe information including a plurality of cooking processes, an acquisition unit that acquires the recipe information, a specification unit that specifies a cooking process described with a qualitative expression from the acquired recipe information, a search unit that searches for a qualitative expression described in the specified cooking process from pieces of recipe information stored in the recipe information storage unit, and a conversion unit that converts a description of the specified cooking process into a quantitative expression based on a result of the search made by the search unit.

In addition, to accomplish the objective described above, a system according to the present disclosure includes a recipe information storage unit that stores recipe information including a plurality of cooking processes, an acquisition unit that acquires the recipe information, a specification unit that specifies a cooking process described with a qualitative expression from the acquired recipe information, a search unit that searches for a qualitative expression described in the specified cooking process from pieces of recipe information stored in the recipe information storage unit, and a conversion unit that converts a description of the specified cooking process into a quantitative expression based on a result of the search made by the search unit.

In addition, to accomplish the objective described above, a method according to the present disclosure includes a step of storing recipe information in a recipe information storage unit, the recipe information including a plurality of cooking processes, a step of acquiring the recipe information, a step of specifying a cooking process described with a qualitative expression from the acquired recipe information, a step of searching for a qualitative expression described in the specified cooking process from pieces of stored recipe information, and a step of converting a description of the specified cooking process into a quantitative expression based on a result of the search made in the step of searching.

In addition, to accomplish the objective described above, a program according to the present disclosure causes a computer to execute the method described above.

Advantageous Effect of Disclosure

According to the present disclosure, qualitative expressions in recipe information can be converted into quantitative expressions.

An embodiment of the present disclosure will be described below with reference to the drawings. In all of the drawings used for illustrating the embodiment, the same constituent components are denoted by the same reference characters, and repetitive descriptions thereof will be omitted. The embodiment described below shall not be construed as unreasonably limiting the content of the present disclosure described in the claims. In addition, all of the constituent components described in the embodiment are not necessarily essential for the present disclosure.

Outline of Embodiment

A recipe information conversion system according to the present embodiment is a system that converts qualitative expressions in recipe information into quantitative expressions. As used herein, the term "qualitative expression" refers to an expression that describes a detail of a cooking process with an abstract word. In other words, the term refers to an expression that includes no numerical values such as quantity, temperature, and time, for expressing how to process an ingredient and how the ingredient looks like or smells like in a cooking process. Specific examples of the qualitative expression include "roast meat until it smells good", "add a little bit of salt", "boil potatoes until the potatoes can be pierced through with a skewer", and the like. The term "quantitative expression" refers to an expression that describes a detail of a cooking process with a specific numerical value. Specific examples of the quantitative expression include "roast meat in the oven at 200 degrees for 20 minutes", "3 g of salt", "microwave potatoes at 600 watts for 5 minutes", and the like. In other words, the quantitative expression expresses a detail of a process using a cooking appliance (tool) specifically with a numerical value; therefore, it can be said that the quantitative expression is suitable for controlling a cooking appliance.

Recipe information described with a qualitative expression or a quantitative expression to allow a human to interpret the recipe information will be herein referred to as human readable recipe (HRR). In particular, quantitative recipe information that is described with a quantitative expression will be denoted by quantitative HRR.

In recent years, anyone has been enabled to publish recipes freely and to enjoy recipes through the Internet or the like. Therefore, cooking processes of recipes posted by a large number of unspecified individuals include various kinds of expressions. Many recipes include qualitative expressions as described above and thus do not provide specific temperature settings, cooking times, and the like of cooking appliances; therefore, a cooker in some cases fails to make a dish as the recipe suggests particularly in a case where the cooker is a beginner or a case where the cooker makes the dish for the first time.

In addition, home appliances have become more IoT-oriented recently; amid the emergence of network-aware cooking appliances such as smart home appliances, recipes including qualitative expressions, which are unsuitable for controlling cooking appliances, may become difficult to use.

Hence, a recipe information conversion system according to the embodiment converts a qualitative expression in a recipe into a quantitative expression. This system makes it easy to control a cooking appliance and allows any user to make a dish as a recipe suggests.

<Appliance Control Recipe Information>

Appliance control recipe information according to the embodiment is recipe information including a series of cooking processes that a cooking appliance can interpret, and an appliance to be controlled is an appliance that relates to ingredients of a dish or relates to cooking for which the ingredients are used. A cooking appliance given appliance control recipe information performs actions (processing) according to the appliance control recipe information. Appliance control recipe information that a cooking appliance can read and interpret will be herein referred to as machine readable recipe (MRR).

FIG. 1 is a diagram illustrating a data structure of appliance control recipe information according to the embodiment. As illustrated in FIG. 1, the appliance control recipe information according to the embodiment is expressed in a form of a graph (directed graph) including a plurality of nodes and edges between the nodes. In FIG. 1, nodes are illustrated as circles, and edges are illustrated as arrows.

The plurality of nodes each define a state transition of each ingredient. The edges each represent an action necessary for a state transition between nodes. An action refers to a basic procedure that constitutes cooking: examples of the action include a procedure such as "cut" and "heat up". In addition, an action includes a specific temperature, cooking time, and a detail of a process to be set to an appliance. A type and an ID of an action are specified in advance, or the ID is given to the kind of the action afterward; a list of actions and their IDs is defined, and each of the edges is given an action ID selected from this list. Note that an ID may be also given to a state (intermediate node).

A plurality of nodes in a graph include an ingredient node, which is a starting point of the graph and represents an ingredient of a dish, a dish node, which is an end point of the graph and represents the dish, and intermediate nodes, each of which represents a state of the ingredient on a way to the dish. The ingredient refers to an ingredient used for making a dish, but a seasoning or a thing that is disposed of in a course of cooking may be considered as the ingredient. A type and an ID of an ingredient are specified in advance, a list of ingredients and their IDs is defined, and an ingredient node is given an ingredient ID selected from this list. A state of an ingredient refers to a state after an action is performed on the ingredient; for example, "ingredient A cut into three equally", "ingredient B diced into 3 cm cubes", "heated ingredient C", and the like each apply to a state of an ingredient.

As described above, the data structure of the appliance control recipe information according to the embodiment is expressed in a graph of state transitions of each ingredient rather than a graph of raw descriptions of recipe sentences written in a natural language. Each ingredient is given an ingredient ID for identifying the ingredient uniquely, and each action necessary for a state transition is given an action ID for identifying the action uniquely. Therefore, the IDs enable a machine to interpret recipe information easily and reliably. In addition, it is not always necessary for recipe information to specify an appliance to perform actions, which makes it easy to support various types of appliances including newly-developed appliances that will appear in the future. Moreover, since all actions are expressed as edges, it is easy to extract actions from recipe information.

By opening some edges from the graph as illustrated in FIG. 1 and further removing some isolating nodes, a subgraph is obtained, which can be regarded as appliance control information in a cooking process of controlling a given cooking appliance to make a dish, out of a series of cooking processes shown in recipe information. In other words, out of the cooking processes of the entire recipe information, appliance control information in a cooking process that the given cooking appliance performs can be expressed as a subgraph.

Table 1 shows types of node in appliance control recipe information according to the embodiment.

TABLE 1

| TYPE OF NODE | NOTE |
| --- | --- |
| INGREDIENT NODE | This node represents an ingredient of a dish, and a graph starts from this node. This node requires an ingredient ID. |
| INTERMEDIATE NODE | This node has edges IN and OUT and represents an intermediate state of a dish. |
| DISPOSAL NODE | This node represents, for example, peeled skins. This node is a kind of terminal node but does not represent a dish. |
| DISH NODE | This node is a terminal node representing a dish. |
| SPECIAL NODE | This node is an auxiliary node for an appliance such as heating an oven. |

Each node can be given attributes shown in Table 2 as attributes of the node. Here, the node is assumed to be an ingredient node that represents "carrot".

TABLE 2

| ATTRIBUTE OF NODE | EXAMPLE |
| --- | --- |
| STATE | Raw |
| NAME | Carrot (or Ingredient ID) |
| QUANTITY | Quantity (weight) of ingredient |

Note that "Name" is information necessary for a human to create and interpret an MRR and thus is not necessarily machine-readable.

Each edge can be given attributes shown in Table 3 as attributes of the edge.

TABLE 3

| ATTRIBUTE OF EDGE | NOTE |
| --- | --- |
| NAME | Name of an action such as "cut" and "heat". |
| ACTION ID | ID corresponding to the name of the action. |
| TERMINATION CONDITION | Dice into "3 cm cubes", boil "for 5 minutes", etc. A condition for terminating the action. |
| APPLIANCE | ID representing an appliance such as "oven" and "microwave oven". |
| SEQUENTIAL ORDER AMONG EDGES | Number representing a sequential order at which the action is executed. |

Each of the nodes will be described with a specific example. In making a dish "salad", a dish node is "salad". In addition, ingredient nodes are, for example, "onion", "cucumber", "tomato", "ketchup", and "mayonnaise". The ingredient nodes are each given an ID for identifying each of the ingredients uniquely.

An ingredient node "onion" is connected to an intermediate node "minced onion" with an edge (action) "cut". An ingredient node "cucumber" is connected to an intermediate node "cucumber diced into 1 cm cubes" with an edge (action) "cut". An ingredient node "tomato" is connected to an intermediate node "½ tomato" with an edge (action) "cut". An ingredient node "ketchup" and an ingredient node "mayonnaise" are connected to an intermediate node "sauce aurore" with an edge (action) "mix". The actions "cut" and "mix" are each given an ID for identifying each of the actions uniquely.

Then, the intermediate nodes "minced onion", "cucumber diced into 1 cm cubes", and "½ tomato" are connected to the dish node "salad" with an edge (action) "arrange". The intermediate node "sauce aurore" is connected to the dish node "salad" with an edge (action) "put". The actions "arrange" and "put" are each given an ID for identifying each of the actions uniquely. In addition, a sequential order is set to the edges such that "put" is performed after "arrange". The action "put" may be replaced with "dress".

DESCRIPTION OF EMBODIMENT

An embodiment of a recipe information conversion system using the data structure described above will be described.

(Configuration of Recipe Information Conversion System 1)

Figure 2:
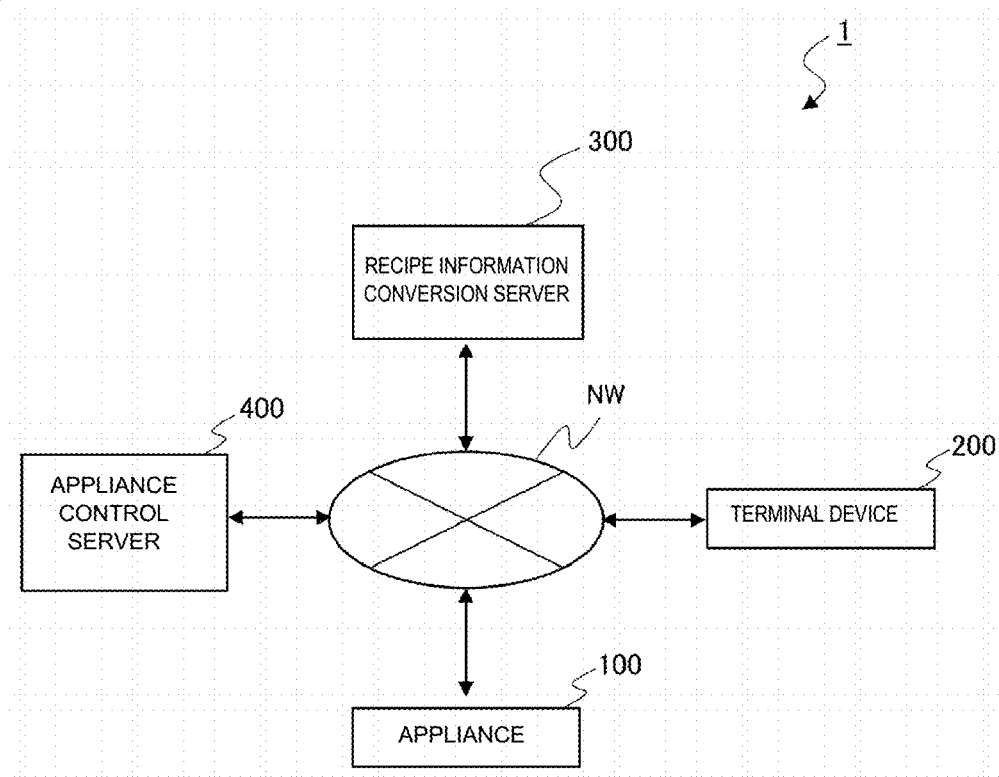
FIG. 2 is a configuration diagram of a recipe information conversion system 1.

FIG. 2 is a configuration diagram of a recipe information conversion system 1. Referring to FIG. 2, a configuration of the recipe information conversion system 1 will be described.

The recipe information conversion system 1 includes an appliance 100, a terminal device 200, a recipe information conversion server 300, and an appliance control server 400, which are connected to one another over a network NW so as to communicate with one another. The network NW is constituted by a world area network (WAN), a local area network (LAN), and the like. Note that the appliance 100 may perform direct communication (e.g., near field communication) with the terminal device 200, not via the network NW. Although FIG. 2 illustrates one appliance 100 and one terminal device 200 as representatives, pluralities of appliances 100 and terminal devices 200 may be connected to the network NW.

The appliance 100 is an appliance that has a communication function, relates to ingredients of a dish or to cooking using the ingredients, and is present in a kitchen space. The appliance 100 may be a home appliance intended for home use or an appliance intended for business use. The appliance 100 may be any kind of appliance as long as the appliance relates to ingredients or to cooking using the ingredients and is present in a kitchen space; examples of the appliance 100 include a refrigerator, a microwave oven, an oven, an induction cooker, a toaster, a food processor, a blender, a rice cooker, a slow cooker, an electric fryer, an electric steamer, a noodle maker, a scale, a kitchen robot, a gas cooker, lighting, and the like.

The terminal device 200 is a device that has a communication function and provides a user interface. In response to an operation made by a user, the terminal device 200 posts (sends) recipe information (recipe sentences, image data on a dish, etc.) to the recipe information conversion server 300. In addition, the terminal device 200 acquires, from the recipe information conversion server 300, recipe information that is converted into quantitative expressions. The terminal device 200 issues a request relating to controlling the appliance 100 to the appliance control server 400, in response to an operation made by a user for a recipe displayed. The terminal device 200 is an information processing terminal, for example, a mobile terminal (e.g., tablet, smartphone, laptop, feature phone, handheld game console, eBook reader, etc.). Alternatively, the terminal device 200 may be a television (including a streaming television), a personal computer (PC), a virtual reality (VR) terminal, an augmented reality (AR) terminal, or the like.

The recipe information conversion server 300 converts qualitative expressions included in recipe information posted from the terminal device 200 into quantitative expressions. Based on the quantitative expressions converted into, the recipe information conversion server 300 then creates quantitative recipe information from the posted recipe information. The recipe information conversion server 300 sends the created quantitative recipe information to the terminal device 200. In addition, the recipe information conversion server 300 creates, from the quantitative recipe information, appliance control recipe information (MRR) for controlling the appliance 100. The MRR has a data structure of a recipe described above (see FIG. 1 and Table 1 to Table 3) and is interpretable to a machine. The recipe information conversion server 300 distributes the MRR to the terminal device 200 and/or the appliance control server 400 over the network NW.

The recipe information conversion server 300 may be configured to distribute, in response to a request from the terminal device 200 and from among pieces of accumulated recipe information, a piece of recipe information that matches the request to the terminal device 200. The terminal device 200 displays the piece of recipe information acquired from the recipe information conversion server 300.

The recipe information conversion server 300 may collect pieces of appliance control information from the appliance control server 400 and converts qualitative expressions into quantitative expressions based on the pieces of appliance control information.

The appliance control server 400 acquires an MRR from the recipe information conversion server 300 or the terminal device 200 and creates a command to control the appliance 100 (hereinafter, referred to as "control command"). The appliance control server 400 then transfers the created control command to the appliance 100.

After the control command is transferred to the appliance 100, the appliance 100 starts actions in accordance with the control command. Alternatively, a user of the terminal device 200 performs, on the appliance 100, an action starting operation for causing the appliance 100 to start the actions in accordance with the control command. For example, the appliance 100 is provided with a physical button for receiving the action starting operation. Alternatively, the appliance 100 may display a software button for receiving the action starting operation.

(Hardware Configuration)

Figure 3:
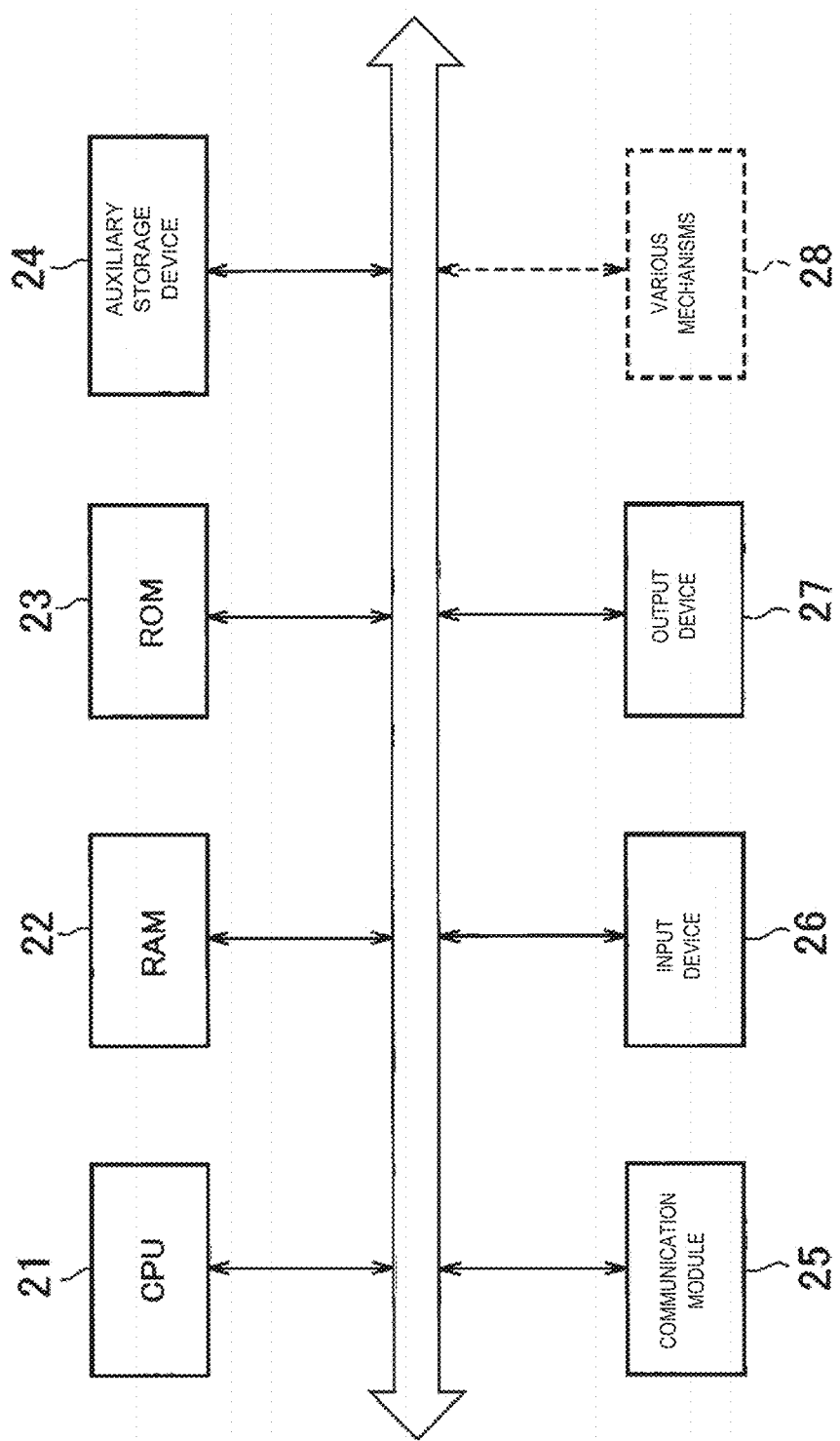
FIG. 3 is a block diagram illustrating a hardware configuration example.

Hardware configurations of the servers, device, and appliance included in the recipe information conversion system 1 will be described. FIG. 3 is a block diagram illustrating a hardware configuration example of each of the appliance 100, the terminal device 200, the recipe information conversion server 300, and the appliance control server 400.

As illustrated in FIG. 3, the appliance 100, the terminal device 200, the recipe information conversion server 300, and the appliance control server 400 each include a CPU 21, a RAM 22, a ROM 23, an auxiliary storage device 24, a communication module 25, an input device 26, and an output device 27.

The CPU 21 reads software (a program) from the RAM 22 and the ROM 23 that constitute a main storage device and executes the software (program). The RAM 22 is used as a working area for the CPU 21. The auxiliary storage device 24 is constituted by a hard disk, a flash memory, or the like. The communication module 25 is a module that transmits and receives data with wired communication or wireless communication. The input device 26 is constituted by a touch panel and/or a keyboard, for example, and receives an operation made by a user. The input device 26 may receive an operation by voice input. The output device 27 is constituted by a display or the like and outputs (displays) various kinds of information.

By causing hardware such as the CPU 21 and the RAM 22 to read the software, the communication module 25, the input device 26, and the output device 27 can be operated under control by the CPU 21, and by causing the hardware to perform read and write on data in the RAM 22 and the auxiliary storage device 24 under control by the CPU 21, a series of functions of the servers, device, and appliance is implemented.

The appliance 100 further includes various mechanisms 28. The various mechanisms 28 are mechanisms for executing actions in the appliance 100 and are constituted by, for example, a heating mechanism, a refrigerating/freezing mechanism, a cutting mechanism, a stirring mechanism, and the like.

(Functional Block Configuration of Terminal Device 200)

Figure 4:
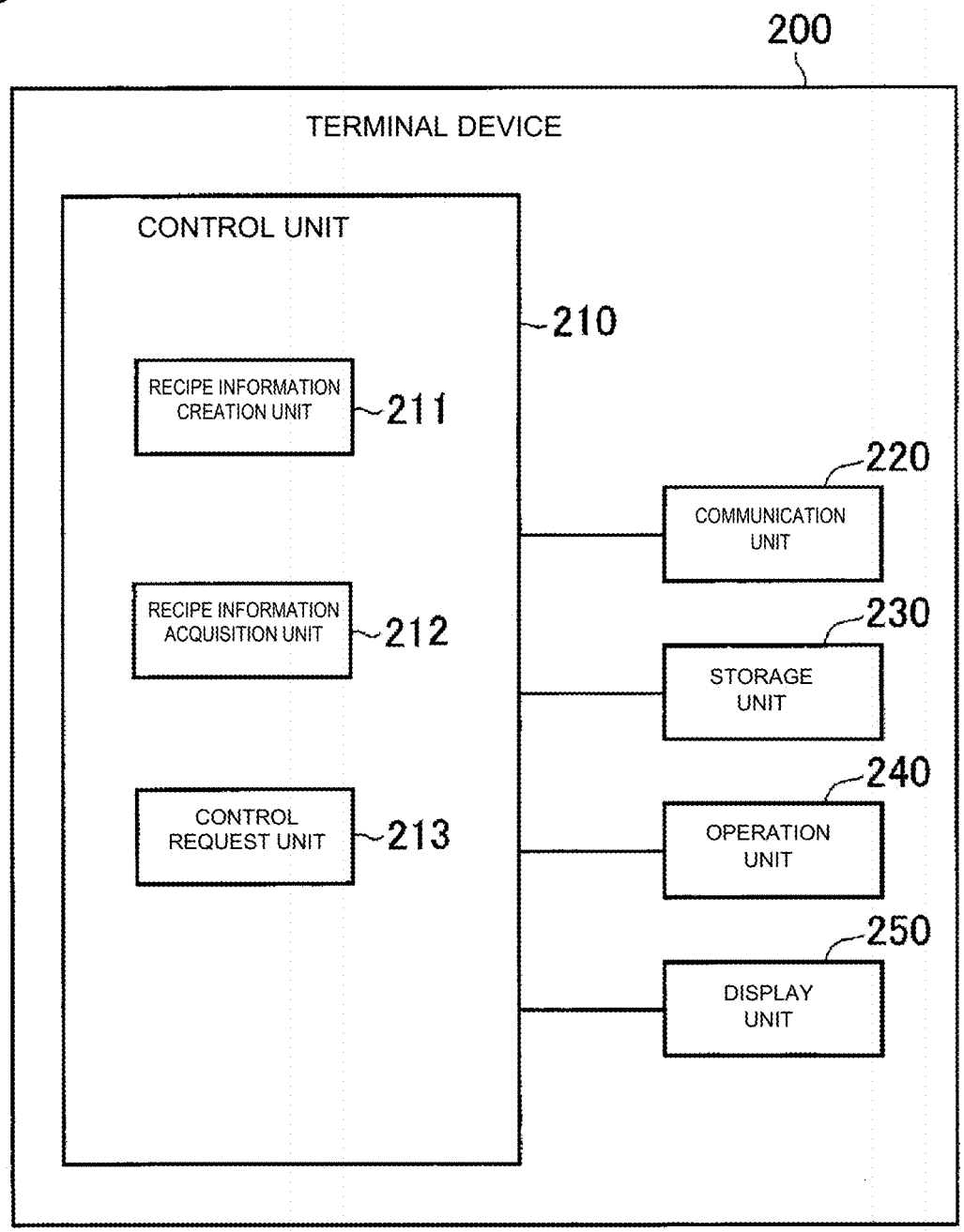
FIG. 4 is a diagram illustrating a functional block configuration of a terminal device 200.

A functional block configuration of the terminal device 200 will be described. FIG. 4 is a diagram illustrating the functional block configuration of the terminal device 200 according to the present embodiment.

As illustrated in FIG. 4, the terminal device 200 includes a control unit 210, a communication unit 220, a storage unit 230, an operation unit 240, and a display unit 250.

The control unit 210 is constituted by including the CPU 21 and controls operation of the terminal device 200. The communication unit 220 is constituted by including the communication module 25 and performs communication over the network NW. The communication unit 220 may have a function of communicating directly with the appliance 100. The storage unit 230 is constituted by including the RAM 22, the ROM 23, and the auxiliary storage device 24 and stores various kinds of information and data. The operation unit 240 is constituted by including the input device 26 and receives a user operation. The display unit 250 is constituted by including the output device 27 (display) and displays various kinds of information and data.

The control unit 210 includes a recipe information creation unit 211, a recipe information acquisition unit 212, and a control request unit 213.

The recipe information creation unit 211 creates recipe information in response to an operation made by a user on the operation unit 240. The recipe information includes a plurality of cooking processes; specifically, ingredients of a dish, quantities of the ingredients, a cooking appliance, a cooking tool, the cooking processes, images of the dish and a scene of cooking photographed, a comment from a user who posted the recipe information. In other words, recipe information created by the recipe information creation unit 211 is an HRR, which is described with qualitative expressions, quantitative expressions, and the like so as to be interpretable to a human. The recipe information creation unit 211 may be configured to control the display unit 250 such that the display unit 250 displays a template of recipe information acquired from the recipe information conversion server 300 in advance, allowing a user to input recipe information in accordance with the template. The recipe information creation unit 211 gives the created recipe information a recipe ID and sends the recipe information via the communication unit 220 to the recipe information conversion server 300.

The recipe information acquisition unit 212 acquires recipe information via the communication unit 220 from the recipe information conversion server 300, in response to an operation made by a user on the operation unit 240. Specifically, the recipe information acquisition unit 212 acquires recipe information converted into quantitative expressions from qualitative expressions (i.e., a quantitative HRR) and an MRR, which is recipe information that the appliance 100 can read and interpret.

The recipe information acquisition unit 212 may acquire a quantitative HRR of a recipe selected by a user from a recipe list displayed on the display unit 250 or may perform search processing using a search condition (keyword, etc.) on the recipe information conversion server 300 to acquire a quantitative HRR matching the condition. The recipe information acquisition unit 212 displays the acquired quantitative HRR on the display unit 250. The quantitative HRR may be displayed together with buttons for sending a control command to the appliance 100 (hereinafter, referred to as "appliance control buttons").

In response to an operation on the appliance control buttons by a user, the control request unit 213 creates a control request for requesting controlling of the appliance 100 and sends the created control request via the communication unit 220 to the appliance control server 400. The control request includes a recipe ID corresponding to a selected recipe (quantitative HRR). The control request may further include an appliance ID of the appliance 100 to be controlled. In addition, the control request unit 213 may send an MRR corresponding to the selected recipe to the appliance control server 400.

(Functional Block Configuration of Recipe Information Conversion Server 300)

Figure 5:
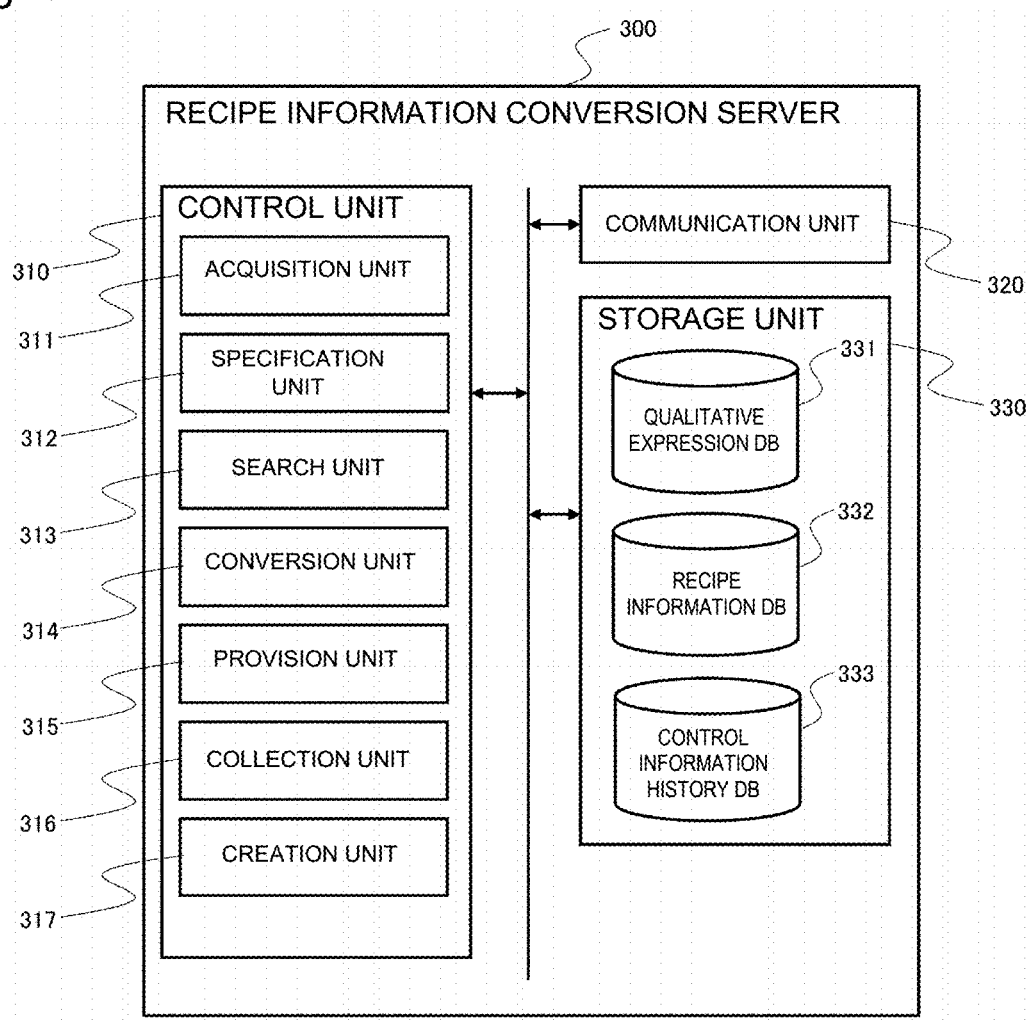
FIG. 5 is a diagram illustrating a functional block configuration of a recipe information conversion server 300.

A functional block configuration of the recipe information conversion server 300 will be described. FIG. 5 is a diagram illustrating the functional block configuration of the recipe information conversion server 300 according to the present embodiment.

As illustrated in FIG. 5, the recipe information conversion server 300 includes a control unit 310, a communication unit 320, and a storage unit 330.

The control unit 310 is constituted by including the CPU 21 and controls operation of the recipe information conversion server 300. The communication unit 320 is constituted by including the communication module 25 and performs communication over the network NW. The storage unit 330 is constituted by including the RAM 22, the ROM 23, and the auxiliary storage device 24 and stores various kinds of information and data. The storage unit 330 additionally includes a qualitative expression DB 331, a recipe information DB 332, and a control information history DB 333. These DBs will be described together with the following constituent components of the control unit 310.

The control unit 310 includes an acquisition unit 311, a specification unit 312, a search unit 313, a conversion unit 314, a provision unit 315, a collection unit 316, and a creation unit 317.

The acquisition unit 311 acquires recipe information posted by a user via the communication unit 320. For example, the acquisition unit 311 acquires recipe information sent from the terminal device 200. Instead of recipe information posted by a user, the acquisition unit 311 may acquire recipe information stored in the recipe information DB 332 described below.

The specification unit 312 specifies a cooking process described in a form of a qualitative expression in the recipe information acquired by the acquisition unit 311. Specifically, the specification unit 312 specifies the cooking process described in a form of a qualitative expression based on qualitative expressions stored in the qualitative expression DB 331 of the storage unit 330. The qualitative expression DB 331 stores qualitative expressions used for dishes in advance. Examples of the qualitative expressions include "a little bit", "tender", "brown", "whitish", "fluffy", and the like. The specification unit 312 specifies a cooking process including such an expression in the acquired recipe information. A human can understand what such an expression itself means but does not know how to determine a quantity or set a temperature and a cooking time of a cooking appliance specifically.

The search unit 313 searches the recipe information DB 332 of the storage unit 330 for the qualitative expression described in the cooking process specified by the specification unit 312.

The recipe information DB 332 functions as a recipe information storage unit and stores a plurality of pieces of recipe information. The recipe information DB 332 stores, for example, pieces of recipe information posted by users and pieces of recipe information created by a company of the recipe information conversion system 1 in advance. The recipe information DB 332 may include recipe information in which a qualitative expression is described being accompanied with a quantitative expression in combination. Such recipe information is, for example, "roast garlic with an 1H cooker at 600 watts for 3 minutes until it smells good", in which a qualitative expression "smells good" accompanied with quantitative expressions "600 watts" and "3 minutes" in combination. In addition, for example, a cooking process described with a qualitative expression may be given a comment from a user who has actually made the dish stating a specific setting of a cooking appliance or may be given a quantitative expression by a company of the recipe information conversion system 1. In the present embodiment, a numerical value written in a vicinity of a qualitative expression is assumed to be a quantitative expression of the qualitative expression; a quantitative expression of a qualitative expression may be inferred by morphological analysis.

The recipe information DB 332 may include recipe information in which a cooking process described with a qualitative expression is associated in advance with appliance control information. For example, a cooking process described with a qualitative expression may be given appliance control information in advance by a company of the recipe information conversion system 1.

From the recipe information DB 332 described above, the search unit 313 acquires a combination of a qualitative expression and a quantitative expression accompanying the qualitative expression, as a result of a search for the qualitative expression described in the cooking process specified by the specification unit 312. In addition, the search unit 313 may acquire, as the result of the search described above, recipe information in which a qualitative expression is associated in advance with appliance control information.

Based on the result of the search by the search unit 313, the conversion unit 314 converts the cooking process described with a qualitative expression specified by the specification unit 312 into the cooking process described with a quantitative expression. Specifically, the conversion unit 314 converts the specified qualitative expression into a quantitative expression that accompanies the qualitative expression included in the result of the search through the recipe information DB 332. In addition, the conversion unit 314 converts the specified qualitative expression into a quantitative expression based on, for example, appliance control information that is associated in advance with the qualitative expression included in the result of the search. As described above, appliance control information has the data structure as illustrated in FIG. 1, in which a state transition of each ingredient is defined as a node of a graph, and each action necessary for a state transition between nodes is defined as an edge of the graph. In other words, it can be said that appliance control information includes a quantitative expression for controlling an appliance. The conversion unit 314 interprets a state of an ingredient and an action defined respectively as a node and an edge in appliance control information associated with the cooking process described with the specified qualitative expression and converts the cooking process described with the qualitative expression into the cooking process described with a quantitative expression.

In addition, the conversion unit 314 may be configured to convert the qualitative expression described in the cooking process specified by the specification unit 312 into a quantitative expression described with a prescribed value. For example, for each qualitative expression, a typical pattern of a quantitative expression that expresses the qualitative expression is stored in the qualitative expression DB 331 in advance, and the conversion unit 314 selects an appropriate quantitative expression from among the stored patterns based on a kind of a dish indicated by the acquired recipe information.

Based on the cooking process described with the quantitative expression converted into by the conversion unit 314, the provision unit 315 converts the recipe information acquired by the acquisition unit 311 into recipe information described with the quantitative expression (a quantitative HRR). Specifically, in the recipe information acquired by the acquisition unit 311, the cooking process described with the qualitative expression specified by the specification unit 312 is replaced with the cooking process described with the quantitative expression converted into by the conversion unit 314, by which the quantitative HRR described with the quantitative expression is created. The provision unit 315 then sends the quantitative HRR via the communication unit 320 to the terminal device 200. The provision unit 315 may store the recipe information acquired by the acquisition unit 311 and the quantitative HRR in the recipe information DB 332, with the recipe information being associated with the quantitative HRR.

The collection unit 316 collects appliance control information on the appliance 100 via the communication unit 320 from the appliance control server 400. For example, the appliance control server 400 acquires an operation (details of control) input by a user for the appliance 100, a recipe ID of a recipe including the operation, and the like as appliance control information over the network NW and transfers the appliance control information to the recipe information conversion server 300. The collection unit 316 stores the collected appliance control information in the control information history DB 333, which functions as a history storage unit.

Alternatively, the appliance control server 400 may be configured to acquire, based on a qualitative expression as a result of a search by the search unit 313, appliance control information on a relevant appliance 100. For example, the collection unit 316 infers an appliance to be used in a cooking process described with a qualitative expression from an image included in recipe information, descriptions across the qualitative expression, and the like. The collection unit 316 may request the appliance control server 400 to acquire appliance control information on the inferred appliance 100.

Based on appliance control information stored in the control information history DB 333, the conversion unit 314 may correct a cooking process converted into a quantitative expression. In other words, the conversion unit 314 corrects a cooking process described with a quantitative description that is converted into based on a result of a search through the recipe information DB 332, based on the control information history DB 333 that stores the appliance control information collected from the appliance control server 400. For example, the conversion unit 314 acquires, out of pieces of appliance control information stored in the control information history DB 333, a piece of appliance control information on which a recipe ID or a dish matches a recipe ID or a dish of the recipe information acquired by the acquisition unit 311, and determines whether the converted quantitative expression is appropriate based on the piece of appliance control information. In a case where the converted quantitative expression deviates from the quantitative expression based on the appliance control information by a predetermined range or more, the conversion unit 314 corrects the quantitative expression based on the appliance control information.

Alternatively, the conversion unit 314 may be configured to learn a relation between cooking processes described with qualitative expressions stored in the recipe information DB 332 and pieces of appliance control information stored in the control information history DB 333 by machine learning, to build a learning model. Based on the built learning model, the conversion unit 314 converts a qualitative expression into a quantitative expression. The building of the learning model by machine learning can be performed with a well-known technique.

The collection unit 316 may collect appliance control information on the appliance 100 that is applied at a time when a user actually makes a dish based on a quantitative HRR sent to the terminal device 200 by the provision unit 315. Based on the collected appliance control information, the conversion unit 314 may correct the converted quantitative expression. In a case where the converted quantitative expression deviates from a quantitative expression based on the collected appliance control information by a predetermined range or more, the case is considered to be a case where a user did not agree to cooking in accordance with a quantitative HRR provided by the provision unit 315 and controlled the appliance 100 in accordance with the user's own decision rather than using a numerical value described in the quantitative HRR. Therefore, correcting a quantitative expression based on the collected appliance control information makes it possible to create a quantitative HRR with high accuracy to which the user can agree.

From the quantitative HRR created by the provision unit 315, the creation unit 317 creates appliance control recipe information (MRR) for controlling the appliance 100. Specifically, the creation unit 317 extracts ingredients of a dish, state transitions of the ingredients, and actions from the quantitative HRR and creates an MRR having a data structure that is expressed in a form of a graph constituted by nodes and edges as illustrated in FIG. 1. The ingredients and the state transitions of the ingredients that can be expressed as nodes and the actions that can be expressed as edges are stored in the storage unit 330 as graph information (not illustrated) in advance, and the creation unit 317 creates the MRR based on the graph information. The created MRR is given the recipe ID given to the recipe information acquired from the terminal device 200 and is sent to the terminal device 200 and/or the appliance 100.

Figure 6:
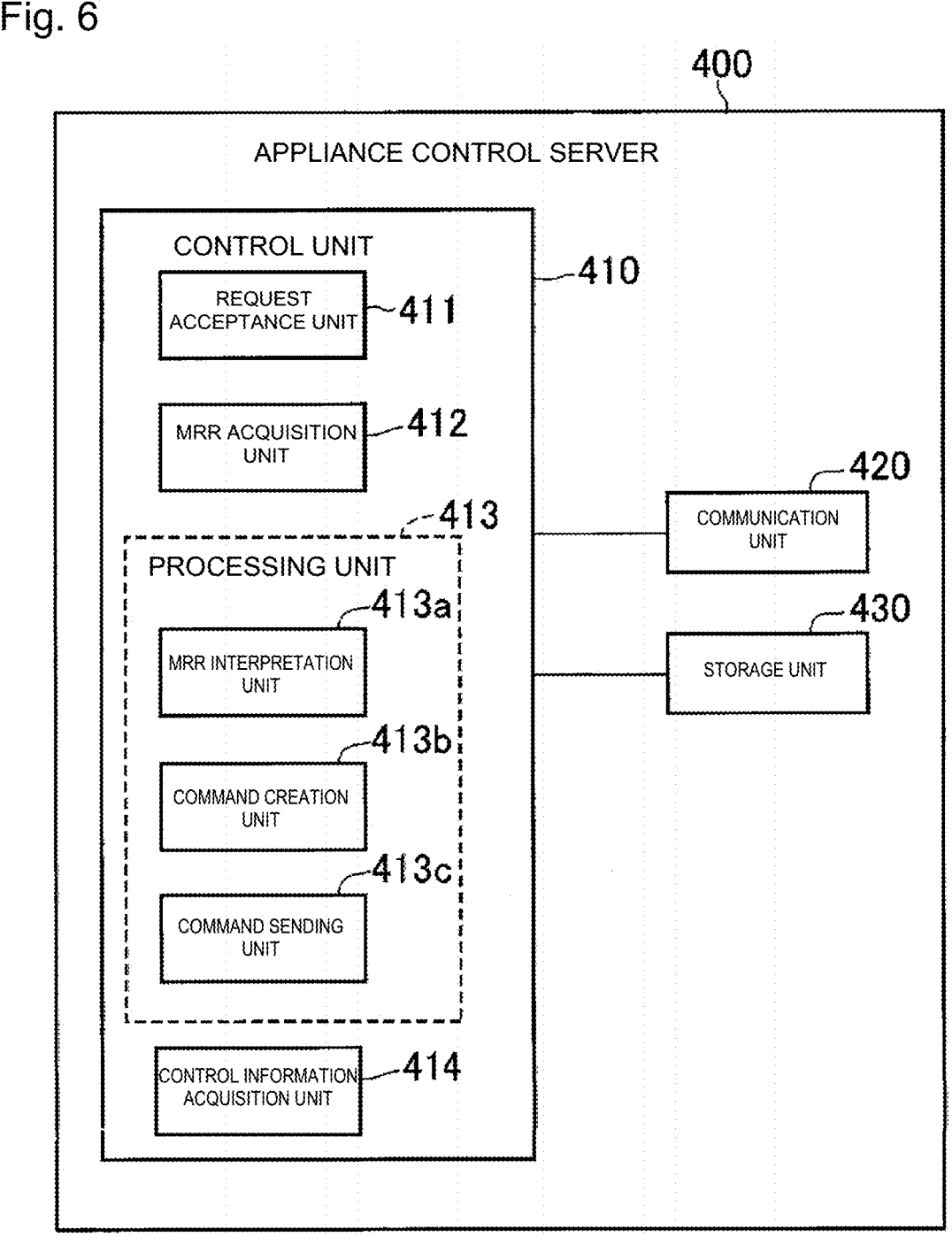
FIG. 6 is a diagram illustrating a functional block configuration of an appliance control server 400.

(Functional Block Configuration of Appliance Control Server 400) Next, a functional block configuration of the appliance control server 400 will be described. FIG. 6 is a diagram illustrating the functional block configuration of the appliance control server 400 according to the present embodiment.

As illustrated in FIG. 6, the appliance control server 400 includes a control unit 410, a communication unit 420, and a storage unit 430.

The control unit 410 is constituted by including the CPU 21 and controls operation of the appliance control server 400. The communication unit 420 is constituted by including the communication module 25 and performs communication over the network NW. The storage unit 430 is constituted by including the RAM 22, the ROM 23, and the auxiliary storage device 24 and stores various kinds of information and data. The storage unit 430 stores an MRR acquired from the recipe information conversion server 300 and a recipe ID, with the MRR being associated with the recipe ID.

A request acceptance unit 411 receives a control request from the terminal device 200 via the communication unit 420. The control request includes the recipe ID corresponding to the selected recipe. The control request may further include an appliance ID of the appliance 100 to be controlled.

An MRR acquisition unit 412 acquires an MRR corresponding to the recipe ID included in the control request from the storage unit 430. The MRR acquisition unit 412 may acquire an MRR from the terminal device 200.

A processing unit 413 interprets the MRR acquired by the MRR acquisition unit 412 and performs processing for controlling the appliance 100 corresponding to the appliance ID included in the control request. The processing unit 413 includes an MRR interpretation unit 413a, a command creation unit 413b, and a command sending unit 413c.

The MRR interpretation unit 413a interprets the MRR acquired by the MRR acquisition unit 412.

Based on a result of the interpretation of the MRR by the MRR interpretation unit 413a, the command creation unit 413b extracts, from the MRR, an action (action ID) that can be executed by the appliance 100 corresponding to the appliance ID included in the control request, and creates a control command for setting the execution of the extracted action. For example, a list of executable actions (action IDs) is defined for each appliance ID. Such a list includes an ID indicating "cut", an ID indicating "roast", an ID indicating "boil", and the like. By referring to such a list, the command creation unit 413b extracts, from the MRR, the action (action ID) that can be executed by the appliance 100 corresponding to the appliance ID included in the control request. Specifically, the command creation unit 413b may compare a list of action IDs of actions that can be executed by an appliance with an action ID of each edge in the MRR, extract a matching action ID, and determine that the appliance is to be charged with an action corresponding to the extracted ID.

The command sending unit 413c sends the command created by the command creation unit 413b via the communication unit 420 to the terminal device 200.

The control information acquisition unit 414 acquires appliance control information over the network NW from the appliance 100.

(Functional Block Configuration of Appliance 100)

Figure 7:
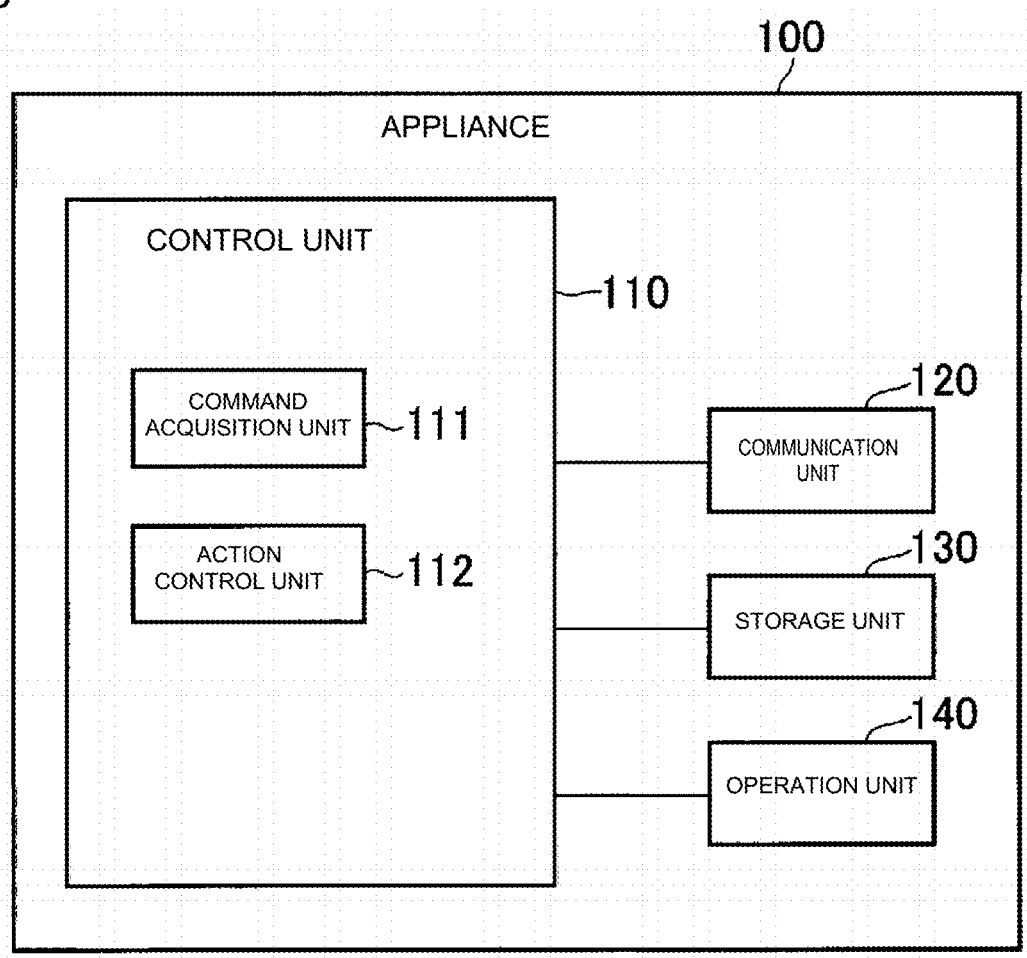
FIG. 7 is a diagram illustrating a functional block configuration of an appliance 100.

Next, a functional block configuration of the appliance 100 will be described. FIG. 7 is a diagram illustrating the functional block configuration of the appliance 100 according to the present embodiment.

As illustrated in FIG. 7, the appliance 100 includes a control unit 110, a communication unit 120, a storage unit 130, and an operation unit 140.

The control unit 110 is constituted by including the CPU 21 and controls operation of the appliance 100. The communication unit 120 is constituted by including the communication module 25 and performs communication over the network NW. The communication unit 120 may have a function of communicating directly with the terminal device 200. The storage unit 130 is constituted by including the RAM 22, the ROM 23, and the auxiliary storage device 24 and stores various kinds of information and data. The operation unit 140 is constituted by including the input device 26 and receives a user operation. The operation unit 140 includes physical buttons or software buttons for receiving an action (processing).

The control unit 110 includes a command acquisition unit 111 and an action control unit 112.

The command acquisition unit 111 acquires a control command sent from the appliance control server 400 or the terminal device 200 via the communication unit 120. The command acquisition unit 111 may acquire, as the control command, details of the processing (control parameters including a cooking process such as boiling, a temperature setting, and a cooking time) that are directly input to the appliance 100 by a user with the physical buttons or the like.

After the control command is acquired by the command acquisition unit 111, the action control unit 112 performs control to start the action corresponding to the control command. The action control unit 112 may start the action in response to making an operation on the operation unit 140 (action start button) by a user.

In addition, the action control unit 112 instructs the communication unit 120 to send the action executed in accordance with the control command as appliance control information via the network NW to the appliance control server 400.

Operation Example 1 According to Embodiment

Figure 8:
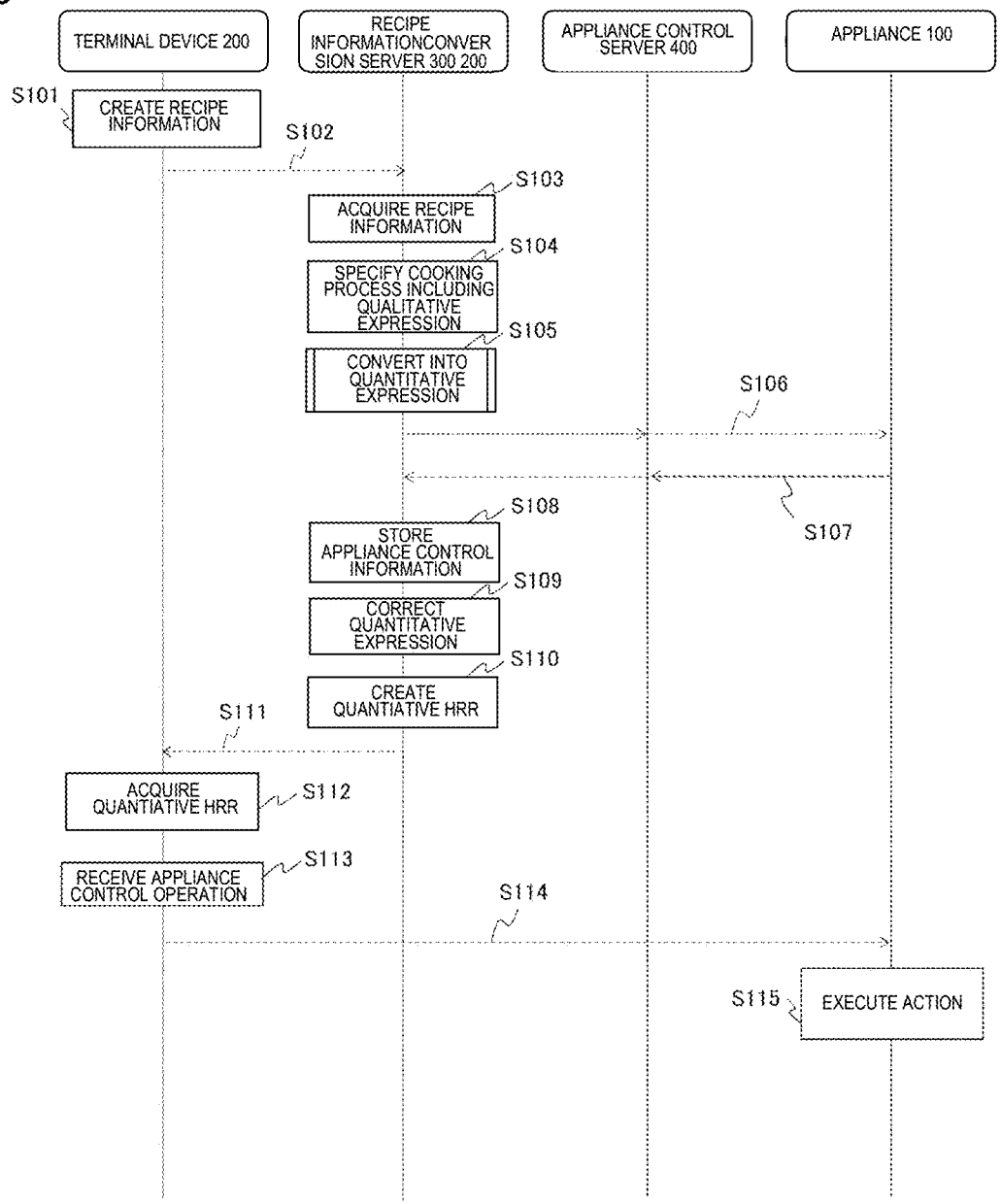
FIG. 8 is a diagram illustrating an operation example of the recipe information conversion system 1.

An example of an operation of the recipe information conversion system 1 according to the present embodiment will be described. FIG. 8 is a diagram illustrating an operation example of the recipe information conversion system 1.

As illustrated in FIG. 8, in step S101, the terminal device 200 receives an input from a user and creates recipe information. The recipe information created in this step is an HRR, understandable to a human, and includes qualitative expressions.

In step S102, the terminal device 200 sends the recipe information created in step S101 to the recipe information conversion server 300.

In step S103, the recipe information conversion server 300 acquires the recipe information from the terminal device 200.

In step S104, the recipe information conversion server 300 specifies a cooking process including a qualitative expression in the acquired recipe information. For example, the recipe information conversion server 300 refers to qualitative expressions stored in the qualitative expression DB 331 to specify the cooking process including a qualitative expression in the acquired recipe information.

In step S105, the recipe information conversion server 300 converts the qualitative expression of the specified cooking process into a quantitative expression. For example, recipe information including the qualitative expression of the specified cooking process is acquired from a result of a search through the recipe information DB 332. The qualitative expression is then converted into the quantitative expression based on a combination of the qualitative expression and a quantitative expression accompanying the qualitative expression included in the result of the search. Alternatively, for example, appliance control information on the appliance 100 associated with the cooking process described with the qualitative expression is acquired from the result of the search. The qualitative expression is then converted into the quantitative expression based on the appliance control information.

In step S106, the recipe information conversion server 300 makes a request to the appliance control server 400 for appliance control information on the appliance 100 to be used in the cooking process converted into the quantitative expression. For example, the recipe information conversion server 300 infers the appliance to be used in the cooking process described with the qualitative expression from an image included in the recipe information, descriptions across the qualitative expression, and the like. The recipe information conversion server 300 may request the appliance control server 400 to acquire the appliance control information on the inferred appliance 100.

In step S107, the appliance control server 400 acquires the appliance control information on the appliance 100 and transfers the appliance control information to the recipe information conversion server 300.

In step S108, the recipe information conversion server 300 stores the appliance control information received from the appliance control server 400 in the control information history DB 333.

In step S109, based on the appliance control information stored in the control information history DB 333, the recipe information conversion server 300 corrects the cooking process converted into the quantitative expression. For example, the recipe information conversion server 300 acquires, out of pieces of appliance control information stored in the control information history DB 333, a piece of appliance control information on which a recipe ID or a dish matches a recipe ID or a dish of the recipe information acquired in step S103, and determines whether the converted quantitative expression is appropriate based on the piece of appliance control information. In a case where the converted quantitative expression deviates from the quantitative expression based on the appliance control information by the predetermined range or more, the recipe information conversion server 300 corrects the quantitative expression based on the appliance control information.

In step S110, based on the cooking process described with the corrected quantitative expression, the recipe information conversion server 300 creates a quantitative HRR described with the quantitative expression from the recipe information acquired in step S103.

In step S111, the recipe information conversion server 300 sends the created quantitative HRR to the terminal device 200.

In step S112, the terminal device 200 acquires the quantitative HRR. The quantitative HRR is then, for example, displayed on the display unit 250 of the terminal device 200 to be presented to a user.

In step S113, the terminal device 200 receives an appliance control operation from the user. For example, reading the quantitative HRR, the user inputs the appliance ID of the appliance to be controlled, specific setting values, and the like via the operation unit 240.

In step S114, the terminal device 200 sends the input from the user to the appliance 100 to be controlled. Alternatively, the user may provide the input directly, manually to the appliance 100 to be controlled.

In step S115, the appliance 100 receives the input from the user and executes the action with the corresponding setting values.

As described above, in the recipe information conversion system 1, a user converts recipe information including qualitative expressions (a qualitative HRR) into recipe information described with quantitative expressions (a quantitative HRR). By operating a cooking appliance in accordance with the recipe information described with the quantitative expressions, a user can make a dish as the recipe suggests.

Note that the recipe information conversion system 1 may be configured to collect appliance control information on cooking that is made in accordance with the quantitative HRR created in step S110, so as to correct quantitative expressions. This can update the quantitative expression to a quantitative expression with high accuracy.

Operation Example 2 According to Embodiment

Figure 9:
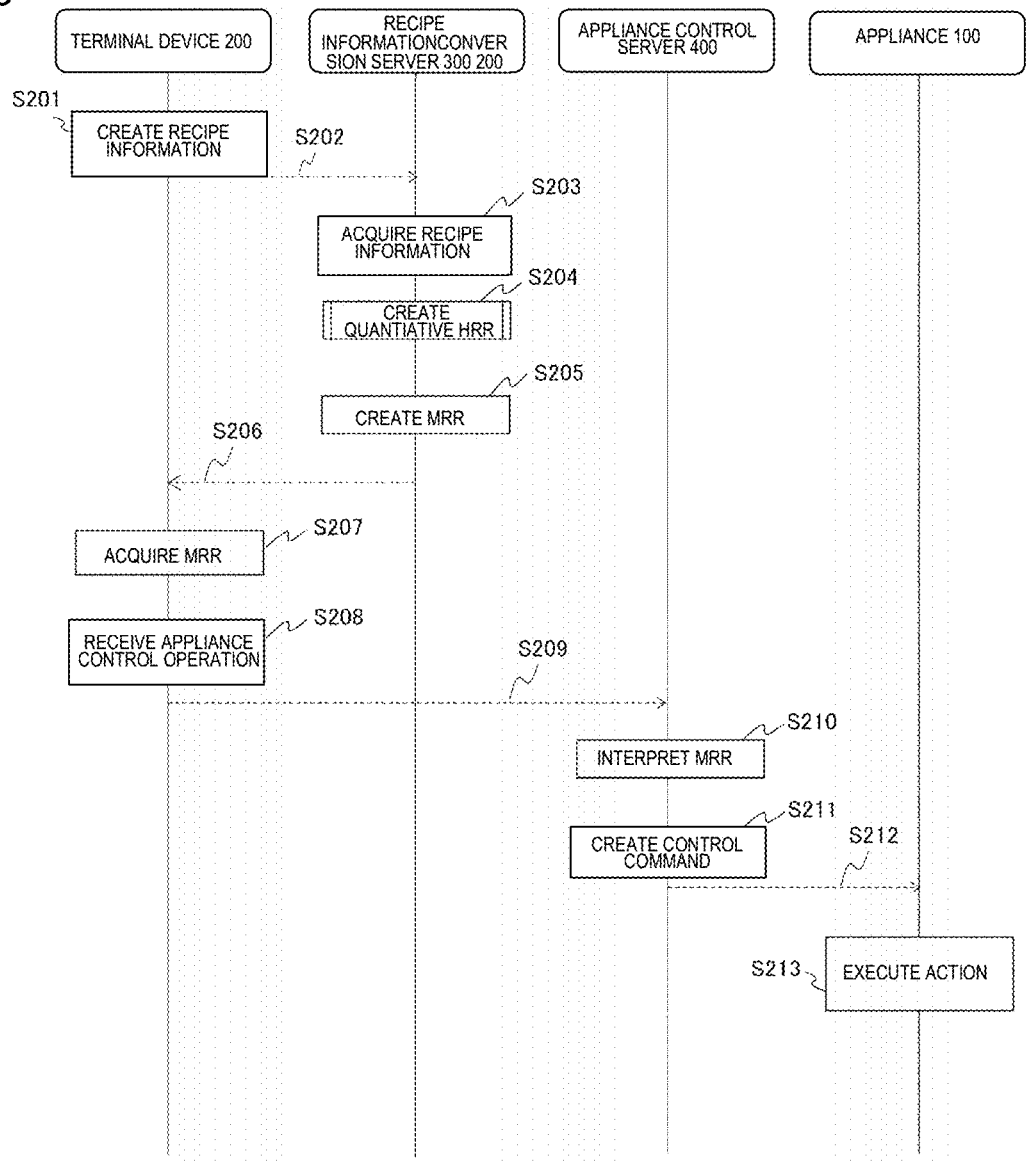
FIG. 9 is a diagram illustrating an operation example of the recipe information conversion system 1 different from the operation example illustrated in FIG. 8.

An example of the operation of the recipe information conversion system 1 according to the present embodiment that is different from the example described with reference to FIG. 8 will be described. FIG. 9 is a diagram illustrating an operation example of the recipe information conversion system 1 different from the operation example illustrated in FIG. 8.

As illustrated in FIG. 9, in step S201, the terminal device 200 receives an input from a user and creates recipe information. The recipe information created in this step is an HRR, understandable to a human, and includes qualitative expressions.

In step S202, the terminal device 200 sends the recipe information created in step S201 to the recipe information conversion server 300.

In step S203, the recipe information conversion server 300 acquires the recipe information from the terminal device 200.

In step S204, the recipe information conversion server 300 creates a quantitative HRR from the acquired recipe information. A process of step S204 is equivalent to processes of steps S104 to S110 in FIG. 8, and thus a description of step S204 will be omitted.

In step S205, based on the quantitative HRR, the recipe information conversion server 300 creates appliance control recipe information (MRR) for controlling the appliance 100.

In step S206, the recipe information conversion server 300 sends the created MRR to the terminal device 200.

In step S207, the terminal device 200 acquires the MRR.

In step S208, the terminal device 200 receives an appliance control operation from the user. For example, the user inputs a recipe ID or the like that corresponds to the acquired MRR. The terminal device 200 may be configured to display an image of a dish and the like corresponding to the acquired MRR on the display unit 250, so as to allow the user to select a desired dish.

In step S209, the terminal device 200 sends the MRR corresponding to the input operation by the user to the appliance control server 400.

In step S210, the appliance control server 400 interprets the MRR acquired from the terminal device 200.

In step S211, based on a result of the interpretation of the MRR, the appliance control server 400 extracts, from the MRR, an action (action ID) that can be executed by the appliance 100, and creates a control command for setting the execution of the extracted action.

In step S212, the appliance control server 400 sends the created control command to the appliance 100 to be controlled.

In step S213, the appliance 100 executes the action corresponding to the control command acquired from the appliance control server 400.

As described above, the recipe information conversion system 1 converts recipe information including qualitative expressions (a qualitative HRR) into appliance control recipe information (MRR) for controlling the appliance 100. The MRR enables a user to control the appliance 100 automatically, so as to make a dish as the recipe suggests.

Other Embodiments

The embodiment is described above; the statements and the drawings constituting a part of this disclosure should not be construed as limiting this disclosure. This disclosure clarifies various alternative embodiments, examples, and operation techniques for those skilled in the art.

The above embodiment is described about an example in which the recipe information conversion server 300 and the appliance control server 400 are separate server apparatuses. However, the recipe information conversion server 300 and the appliance control server 400 may be integrated into a single server apparatus by equipping the single server apparatus with the functions of the recipe information conversion server 300 and the appliance control server 400. Alternatively, the terminal device 200 may be equipped with the functions of the recipe information conversion server 300.

A program for causing a computer to execute the processes performed in the recipe information conversion system 1 may be provided. The program may be recorded in a computer readable medium. With the computer readable medium, the program can be installed in a computer. Here, the computer readable medium in which the program is recorded may be a non-transitory recording medium. The non-transitory recording medium is not limited to a specific recording medium but may be, for example, a recording medium such as a CD-ROM and a DVD-ROM.

Advantages

The recipe information conversion system according to the present embodiment converts recipe information including qualitative expressions into recipe information described with quantitative expressions. With this system, by operating a cooking appliance in accordance with recipe information described with quantitative expressions, a user can make a dish as the recipe suggests.

In addition, the recipe information conversion system according to the present embodiment collects appliance control information on a cooking appliance, so as to correct quantitative expressions. This can update the quantitative expression to a quantitative expression with higher accuracy.

In addition, the recipe information conversion system according to the present embodiment provides recipe information described with quantitative expressions to a user and collects appliance control information on a cooking appliance that is applied at a time when the user actually makes a dish in accordance with the provided recipe information. By correcting quantitative expressions based on the collected appliance control information, quantitative expressions can be updated to those with higher accuracy.

In addition, the recipe information conversion system according to the present embodiment creates appliance control recipe information (MRR) based on recipe information described with quantitative expressions that are converted into from qualitative expressions. This enables control of a network-aware cooking appliance such as a smart home appliance, which frees a user from the inconvenience of thinking about settings of a cooking appliance and allows the user to enjoy cooking.

The present embodiment can be embodied in a variety of other forms; furthermore, various omissions, substitutions, and changes can be made without departing from the gist of the present disclosure. These embodiments and their modifications shall be included in the scope and the gist of the disclosure and included in the disclosures described in claims and equivalents of the disclosures.

REFERENCE SIGNS LIST

1: recipe information conversion system
21: CPU
22: RAM
23: ROM
24: auxiliary storage device
25: communication module
26: input device
27: output device
28: mechanisms
100: appliance
110: control unit
111: command acquisition unit
112: action control unit
113: MRR acquisition unit 114: processing unit
114a: MRR interpretation unit
114b: action control unit
120: communication unit
130: storage unit
140: operation unit
200: terminal device
210: control unit
211: recipe information creation unit
212: recipe information acquisition unit
213: control request unit
220: communication unit
230: storage unit
240: operation unit
250: display unit
300: recipe information conversion server
310: control unit
311: acquisition unit
312: specification unit
313: search unit
314: conversion unit
315: provision unit
316: collection unit
317: creation unit
320: communication unit
330: storage unit
331: qualitative expression DB
332: recipe information DB
333: control information history DB
400: appliance control server
410: control unit
411: request acceptance unit
412: MRR acquisition unit
413: processing unit
413a: MRR interpretation unit
413b: command creation unit
413c: command sending unit
414: control information acquisition unit
420: communication unit
430: storage unit

The invention claimed is:

1. A server apparatus, comprising:
a memory that stores recipe information including a plurality of cooking processes, wherein each cooking process of the plurality of cooking processes is described with a qualitive expression accompanying a quantitative expression and the quantitative expression indicates a detail of the cooking process with a specific numerical value; and
circuitry configured to
acquire, via a network, the recipe information including the plurality of the cooking processes,
store, in the memory, the recipe information,
specify a cooking process, of the plurality of cooking processes in the acquired recipe information, which includes a specific qualitative expression,
search the recipe information stored in the memory for the specific qualitative expression described in the specified cooking process and acquire a particular qualitative expression which corresponds with the specific qualitative expression,
convert the specific qualitative expression into a particular quantitative expression which accompanies the particular qualitative expression as a result of the search, and
send, to a user terminal via the network, quantitative recipe information in a Machine Readable Recipe (MRR) format, the quantitative recipe information including the particular quantitative expression which corresponds to the acquired recipe information, and the quantitative recipe information sent to the user terminal for controlling a cooking appliance based on the quantitative recipe information.

2. The server apparatus according to claim 1, wherein
the result of the search includes a combination of the particular qualitative expression and the particular quantitative expression, and
the circuitry is further configured to perform the conversion based on the particular quantitative expression accompanying the particular qualitative expression.

3. The server apparatus according to claim 2, wherein the circuitry is further configured to:
collect appliance control information for controlling the cooking appliance,
store, in the memory, the collected appliance control information as a control information history, and
correct the quantitative expression based on the control information history.

4. The server apparatus according to claim 3, wherein the circuitry is further configured to:
store, in the memory, the appliance control information on the cooking appliance and a cooking process described with a qualitative expression, with the appliance control information being associated with the cooking process, and
perform the conversion based on the appliance control information included in the result of the search.

5. The server apparatus according to claim 4, wherein the circuitry is further configured to perform the conversion based on a quantitative expression that is determined in advance for each qualitative expression.

6. The server apparatus according to claim 3, wherein the circuitry is further configured to:
collect the appliance control information on the cooking appliance that is operated in accordance with the provision of the quantitative recipe information, and
update the quantitative expression based on the collection.

7. The server apparatus according to claim 6, wherein the circuitry is further configured to:
create appliance control recipe information from the quantitative recipe information, the appliance control recipe information being expressed in a form of a graph including a plurality of nodes and edges between the nodes,
wherein the plurality of nodes include an ingredient node, which is a starting point of the graph and represents an ingredient of a dish, a dish node, which is an end point of the graph and represents the dish, and an intermediate node, which represents a state of the ingredient on a way to the dish, and
wherein each of the edges represent an action necessary for a state transition between nodes.

8. The server apparatus according to claim 1, wherein the cooking appliance includes at least one of a refrigerator, a microwave oven, an oven, an induction cooker, a toaster, a food processor, a blender, a rice cooker, a slow cooker, an electric fryer, an electric steamer, a noodle maker, a scale, a kitchen robot and a gas cooker.

9. The server apparatus according to claim 1, wherein
the server apparatus and the cooking appliance are connected via the network, and
the circuitry is configured to control, via the network, the cooking appliance based on the quantitative recipe information.

10. A method, comprising:

storing, in a memory, recipe information including a plurality of cooking processes, wherein each cooking process of the plurality of cooking processes is described with a qualitive expression accompanying a quantitative expression and the quantitative expression indicates a detail of the cooking process with a specific numerical value;

acquiring, via a network, the recipe information including the plurality of cooking processes;

specifying a cooking process, of the plurality of cooking processes in the acquired recipe information, which includes a specific qualitative expression;

searching the stored recipe information for the specific qualitative expression described in the specified cooking process and acquire a particular qualitative expression which corresponds with the specific qualitative expression;

converting the specific qualitative expression into a particular quantitative expression which accompanies the particular qualitative expression as a result of the search; and sending, to a user terminal of a user via the network, quantitative recipe information in a Machine Readable Recipe (MRR) format, the quantitative recipe information including the particular quantitative expression which corresponds to the acquired recipe information, and the quantitative recipe information sent to the user terminal for controlling a cooking appliance based on the quantitative recipe information.

11. A non-transitory computer-readable recording medium storing computer executable instructions which, when executed by a computer, cause the computer to execute a method comprising:

storing, in a memory, recipe information including a plurality of cooking processes, wherein each cooking process of the plurality of cooking processes is described with a qualitive expression accompanying a quantitative expression and the quantitative expression indicates a detail of the cooking process with a specific numerical value;

acquiring, via a network, the recipe information including the plurality of cooking processes;

specifying a cooking process, of the plurality of cooking processes in the acquired recipe information, which includes a specific qualitative expression;

searching the stored recipe information for the specific qualitative expression described in the specified cooking process and acquire a particular qualitative expression which corresponds with the specific qualitative expression;

converting the specific qualitative expression into a particular quantitative expression which accompanies the particular qualitative expression as a result of the search; and sending, to a user terminal of a user via the network, quantitative recipe information in a Machine Readable Recipe (MRR) format, the quantitative recipe information including the particular quantitative expression which corresponds to the acquired recipe information, and the quantitative recipe information sent to the user terminal for controlling a cooking appliance based on the quantitative recipe information.

* * * * *